United States Patent [19]
Knight, III et al.

[11] Patent Number: 5,737,558
[45] Date of Patent: Apr. 7, 1998

[54] MULTI-COLUMN WINDOWS

[75] Inventors: Joshua Wilson Knight, III, Mohegan Lake; John Timothy Robinson, Yorktown Heights, both of N.Y.

[73] Assignee: International Business Machines Corporation, Armonk, N.Y.

[21] Appl. No.: 512,325

[22] Filed: Aug. 8, 1995

[51] Int. Cl.⁶ .............................. G06F 15/00; G09G 5/00
[52] U.S. Cl. .......................... 395/342; 345/118; 345/121; 395/340; 395/342; 395/787
[58] Field of Search ................................. 395/339, 340, 395/342, 779, 782, 783, 787, 788, 789, 134, 139; 345/118, 119, 121, 127

[56] References Cited

U.S. PATENT DOCUMENTS 5,553,217  9/1996  Hart et al. ............................. 395/783

*Primary Examiner*—Mark R. Powell
*Assistant Examiner*—Huynh Ba
*Attorney, Agent, or Firm*—Douglas W. Cameron

[57] ABSTRACT

A method and apparatus for displaying data on a computer display system. More specifically, with this invention location information of data from an application program is converted to location information for displaying data within a number of contours on a display device. With this invention display data for a logical display area on a first contour is converted to display data for a plurality of contours, where each of the later contours is a logical section of the former contour. More importantly, this conversion is transparent to the application program. The second display data is then displayed on the display device of the computer system.

7 Claims, 5 Drawing Sheets

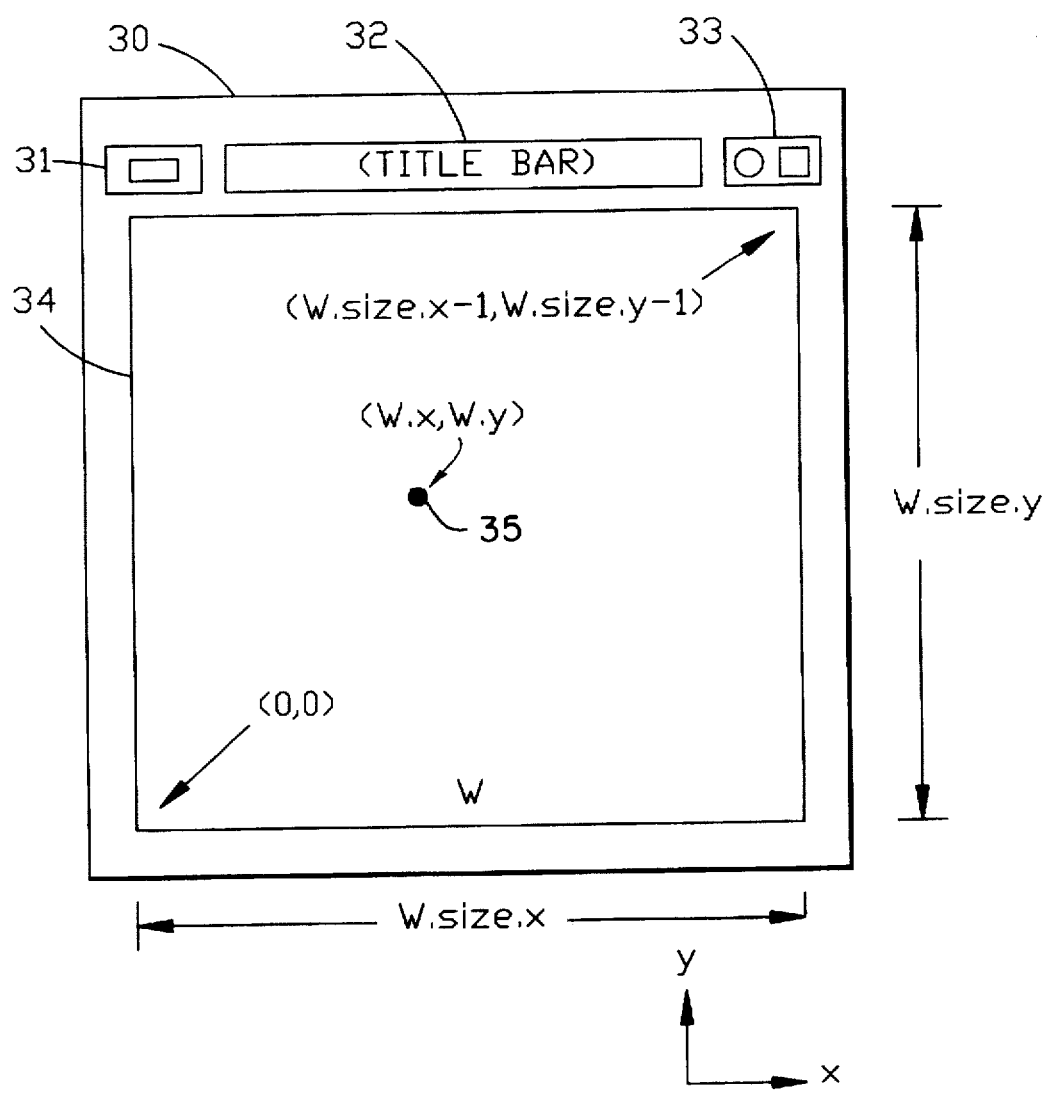

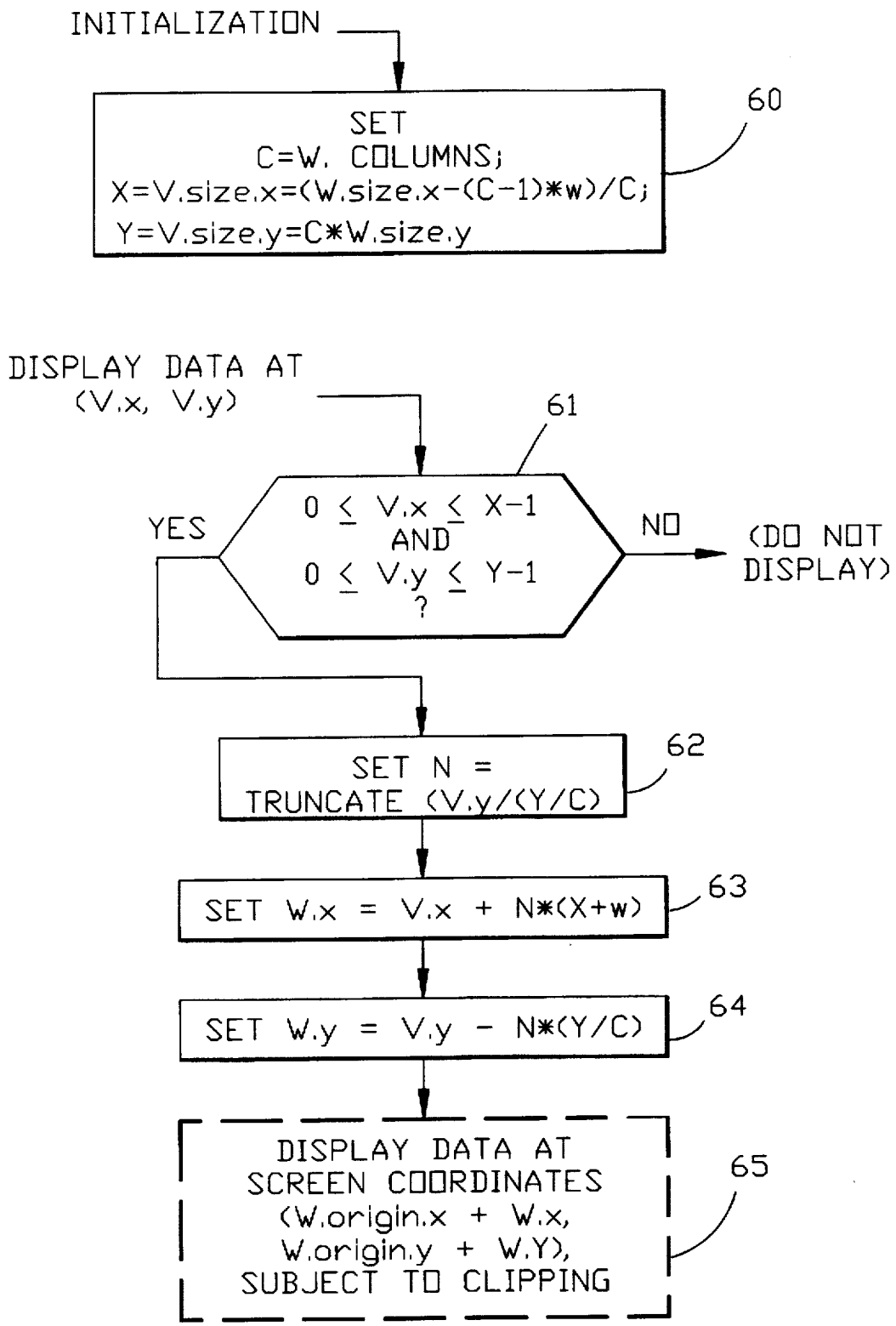

MULTI-COLUMN WINDOWS

DESCRIPTION

1. Technical Field

This invention relates to a computer display system. More specifically, this invention deals with displaying a logical window in a multi-contour format in a manner that is transparent to the application program.

2. Description of the Prior Art

Currently there are a number of window-based user interfaces in common use, examples of which are (OS/2 Presentation Manager™)[1] software, (Microsoft Windows™)[2] software, and so on. Those familiar with these and other such window-based systems understand that at the end-user level, all provide similar functions. A number of windows are shown on a display device. There are similar layouts of windows, in which windows typically consist of a "system-menu" button, a title bar, "minimize/maximize" buttons, "scroll-bars", etc., together with a data area used by an application program. A mouse or other pointing device is provided, so that using the mouse and/or the keyboard, windows can be "selected" (brought to the foreground), re-sized, moved, minimized or maximized, etc. The windows overlap each other arbitrarily, in such a fashion that one window which is determined to be "on top of" another window will "hide" that part of the underlying window with which it may overlap; and so on.

[1] OS/2 Presentation Manager is a trademark of the IBM Corporation
[2] Windows is a trademark of the Microsoft Corporation It may often happen, in such window-based user interfaces, that the user perceives a lack of vertical space, particularly in text windows (windows used to display a number of lines of alphanumeric data), and to a lesser degree in graphics windows (windows displaying image data or textual data intermixed with image data). For example, with typical large displays and a small font, by using all of the display an end-user could obtain, say, a maximum size window of 80 150-character lines (i.e., the geometry is 150×80 in units of (characters,lines) for a particular font). However, in editing programming language source files, input files for document formatting systems, etc., a larger context is often desired (i.e. the user would like to see more than 80 lines at a time). Similarly, in using a document production system in which pages containing text and images are displayed in a fashion similar to that in which they will eventually be printed, it is sometimes desirable to see several pages on the display at one time. Currently, users of such systems tend to approach this problem often by printing the data for which a larger context is desired, or sometimes by opening one or more additional windows on the files containing the data for which the larger context is desired. This latter approach is time consuming, and requires, for example, issuing scrolling commands to each window separately in order to "move around" appropriately in the files. This is in addition to the time consumed in first opening the additional windows. Generating printed copies has known disadvantages. A printer may not be available locally. Printing is time consuming, generates waste, and does not, of course, show any subsequent updates to the data.

Some existing window-based application programs can display data in a multi-column format. For example, the editor program KEDIT (Version 5.0, Mansfield Software Group, Inc.) provides a "screen" command that can be used to divide the screen into multiple columns. However, this function is implemented by the editor program itself and other application programs cannot make use of this function. Furthermore, in the case of this particular example, each column corresponds to a separate editor session (with a separate command line, etc.), rather than to a multi-column view of a single editor session. Thus, although there exist today window-based application programs that can display data in a multi-column format, this function is provided by the application program itself, in a fashion specific to the application program, and of course is not available to other application programs.

Current window managers provide a number of functions that enable the development of window-based applications. For example, as described in "The Design of OS/2", Deitel and Kogen, Addison-Wesley, 1992, pages 267–273, the (OS/2 Presentation Manager) provides functions for creating a "standard window" which consists of a number of windows in a window hierarchy, as shown in FIG. 1. The latter reference is hereby incorporated by reference. After the application creates the application window object 10, the application program need only deal with changes to the client window object 15. The processing of events related to the other window objects (the frame 11, title bar 12, system menu 13, and minimize/maximize 14 windows) are handled by the window manager.

Changes to the client window are handled by means of a message passing architecture, as shown in FIG. 2. At the time the top-level window is created, a message queue 25 for the application 20 is created, and the application passes to the window manager the address of a client window routine 22 for processing messages related to the client window. Using a message loop 21, the application repeatedly receives messages from the message queue 25 by means of calls to the window manager 24 using an application program interface 23 to the window manager. As each subsequent message is received, it is passed to a message dispatcher 26. The window manager message dispatcher then routes messages related to the client window to the client window routine 22 for processing. Messages related to other windows are routed to appropriate window manager routines 27. Examples of such messages are "re-size" (the client window size has changed), and "re-draw" (it is necessary to re-draw the client window). The window manager does not save the contents of the displayed client window. Thus, for example, when a previously hidden portion of the window becomes visible, a "re-draw" message is routed to the application's client window routine, which then issues calls to the window manager so as to re-display all of the client window. Although this and subsequent discussion is based on the OS/2 Presentation Manager, those skilled in the art will recognize that conceptually similar mechanisms are used in other window managers and that in some cases the mechanisms are essentially identical.

FIG. 3 illustrates the display of the objects in FIG. 1. The application program displays data in the client window by issuing calls to the window manager using client window coordinates. FIG. 3 illustrates an application window including a frame window 30, system menu window 31, title bar window 32, minimize/maximize window 33, and client window W 34. As shown in FIG. 3, if the client window size is (W.size.x,W.size.y), displayable client window coordinates range from (0,0) to (W.size.x−1,W.size.y−1). The window manager maps client window coordinates to screen coordinates. Suppose the bottom left corner of the client window (point (0,0) in client window coordinates) is at position (W.origin.x,W.origin.y) in screen coordinates. Then, the window manager will map any point 35 at (W.x,W.y) in client coordinates to the point (W.origin.x+W.x,W.origin.y +W.y) in screen co ordinates. The window manager also handles clipping, that is, not displaying data located at any point that lies outside the client window, is off the screen, or is hidden by another overlaying window.

BRIEF DESCRIPTION OF THE DRAWINGS

FIG. 3 shows a standard window on a display and the range of client window coordinates.

FIG. 6 shows how client coordinates are mapped to screen coordinates by the window manager when the client window has a multi-column format.

SUMMARY OF THE INVENTION

The present invention alleviates the above-described problem of a perceived lack of vertical space in windows typical of applications using current window-based user interfaces by providing a method and an apparatus for the window manager to divide the data area window into a number of columns in a manner transparent to application programs. That is, no changes of application programs are needed.

This invention is accomplished by means of the window manager emulating, at the level of the application program, a single rectangular window which is conceptually the result of "gluing" columns together, with each column viewing a portion of a number of consecutive rows of an original window. For example, the maximal size window described above with geometry 150 characters×80 lines could be split into 3 columns each consisting of 80 lines of 50 characters. At the application program level this split would appear as a window re-sizing to a geometry of 50 characters×240 lines. After this "re-sizing", the application program would display data within the window using a rectangular 50×240 geometry. The "50×240" window would, however, actually be mapped to the display device by the window manager as three adjoining 50×80 rectangular areas.

Accordingly, this invention provides a method and apparatus for displaying data in a computer system. With this invention first display data from an application program is converted into second display data. The first display data is for a logical display area on a first contour, where the second display data is for a plurality of contours. Each second contour is a logical section of the first contour. More importantly, this conversion is transparent to the application program. Finally, the second display data is then displayed on the display device of the computer system. Typically, the first contour is too long in one dimension for display in a single window.

DESCRIPTION OF THE PREFERRED EMBODIMENT

Figure 4A:
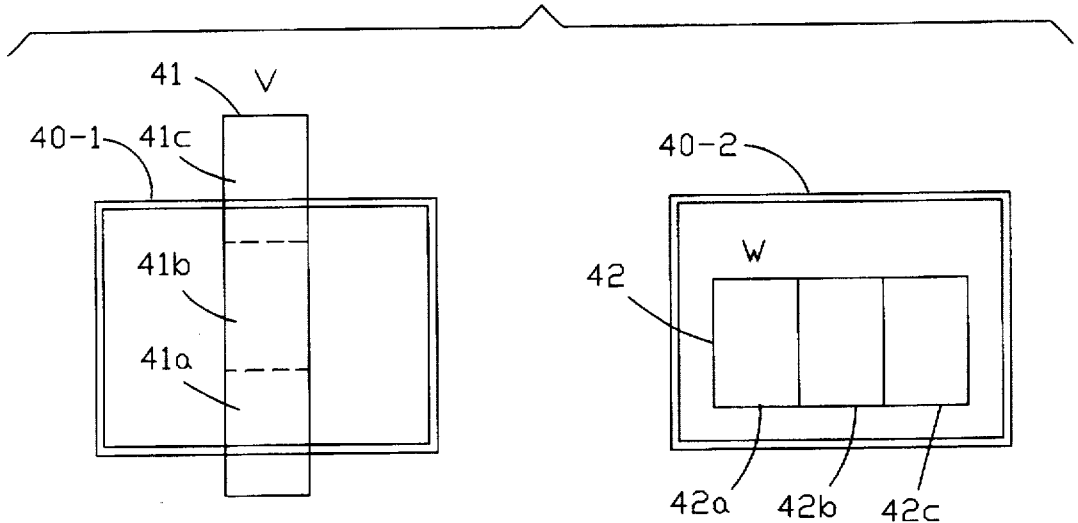
FIGS. 4A, 4B and 4C show examples of logical client window contours and how they may be mapped to contours on a physical display screen.

FIG. 4 illustrates, for various cases, the contour of a logical client window V (41, 44, or 47) (which may not fit on the physical screen), and how the data displayed in a logical window V may be divided into sections (see, for example, sections 41a, 41b, and 41c) and displayed within a plurality of contours within a window W (42, 45, or 48) on the physical screen. First, in FIG. 4A, a logical client window V (i.e., a window as used by an application program) has a contour 41 which is too long in the vertical direction to fit on the screen, an outline of which is shown as 40-1. The data within the logical client window is divided into sections 41a, 41b, and 41c, and displayed within corresponding contours 42a, 42b and 42c within a window W (42) which fits within the screen, the outline of which is shown as 40-2.

Figure 4B:
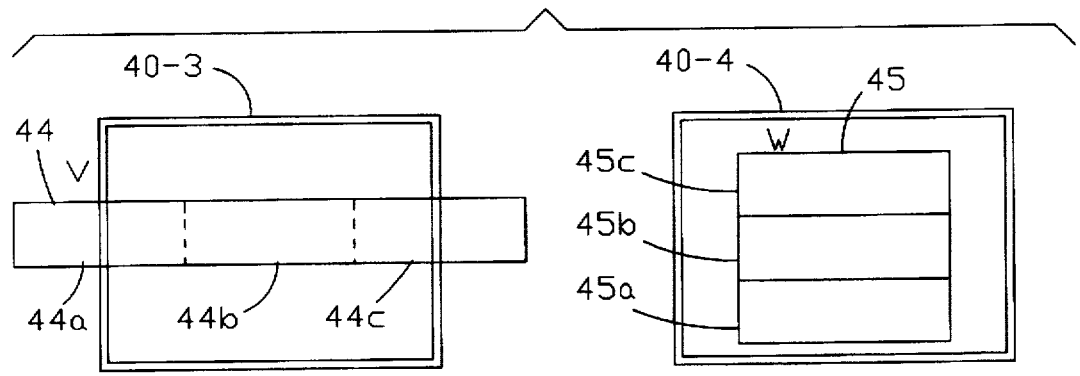

Next, in FIG. 4B, a logical client window V has a contour 44 which is too long in the horizontal direction to fit on the screen with outline 40-3. The data within the logical client window is divided into sections 44a, 44b, and 44c, and displayed within corresponding contours 45a, 45b, and 45c within a window W (45) which fits within the screen with outline 40-4.

Figure 4C:
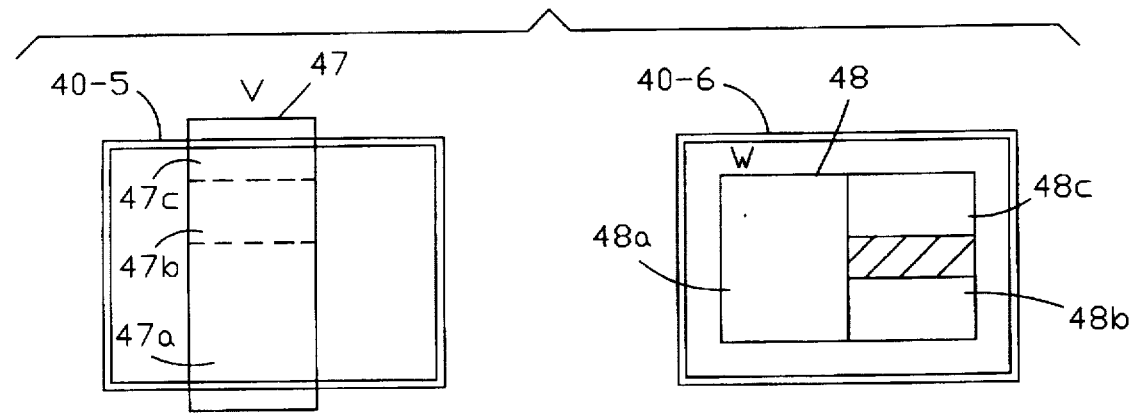

Finally in FIG. 4C, a logical client window V with contour 47 is again shown that is too long in the vertical direction to fit on the screen with outline 40-5. The data within the logical client window is divided into sections 47a, 47b, and 47c, and displayed within corresponding contours 48a, 48b, and 48c in the arrangement as shown within a window W (48) which fits within the screen with outline 40-6.

The means by which client window V coordinates are transformed to W coordinates (where V and W are as in FIG. 4), and then to screen coordinates, will be described in detail for a generalization of the case of FIG. 4A, in which the plurality of contours corresponds to a number of adjoining columns. Furthermore, in practice it may be necessary to indicate visually a separation of the contours, which in the case of FIG. 4A involves displaying column boundaries; this will also be described in detail below. However, it should be recognized that following the description below, it is straightforward to develop similar means for transforming coordinates in the case that the plurality of contours (45a, 45b, and 45c) corresponds to a number of areas that are adjoining in a top to bottom fashion, as in the right side of FIG. 4B, or for arbitrary arrangements of the plurality of contours, as is illustrated by FIG. 4C.

In the preferred embodiment, an additional variable is maintained for each client window W: a number of columns, W.columns, where this variable is an integer greater than or equal to one. If W.columns is equal to one, then client window coordinates are mapped to screen coordinates as in the prior art. However, if W.columns is greater than one, then a mapping of client window coordinates to screen coordinates different than that used in prior art (as described above) will be implemented by the window manager in the processing of all calls by the application to display data in the client window.

Figure 5:
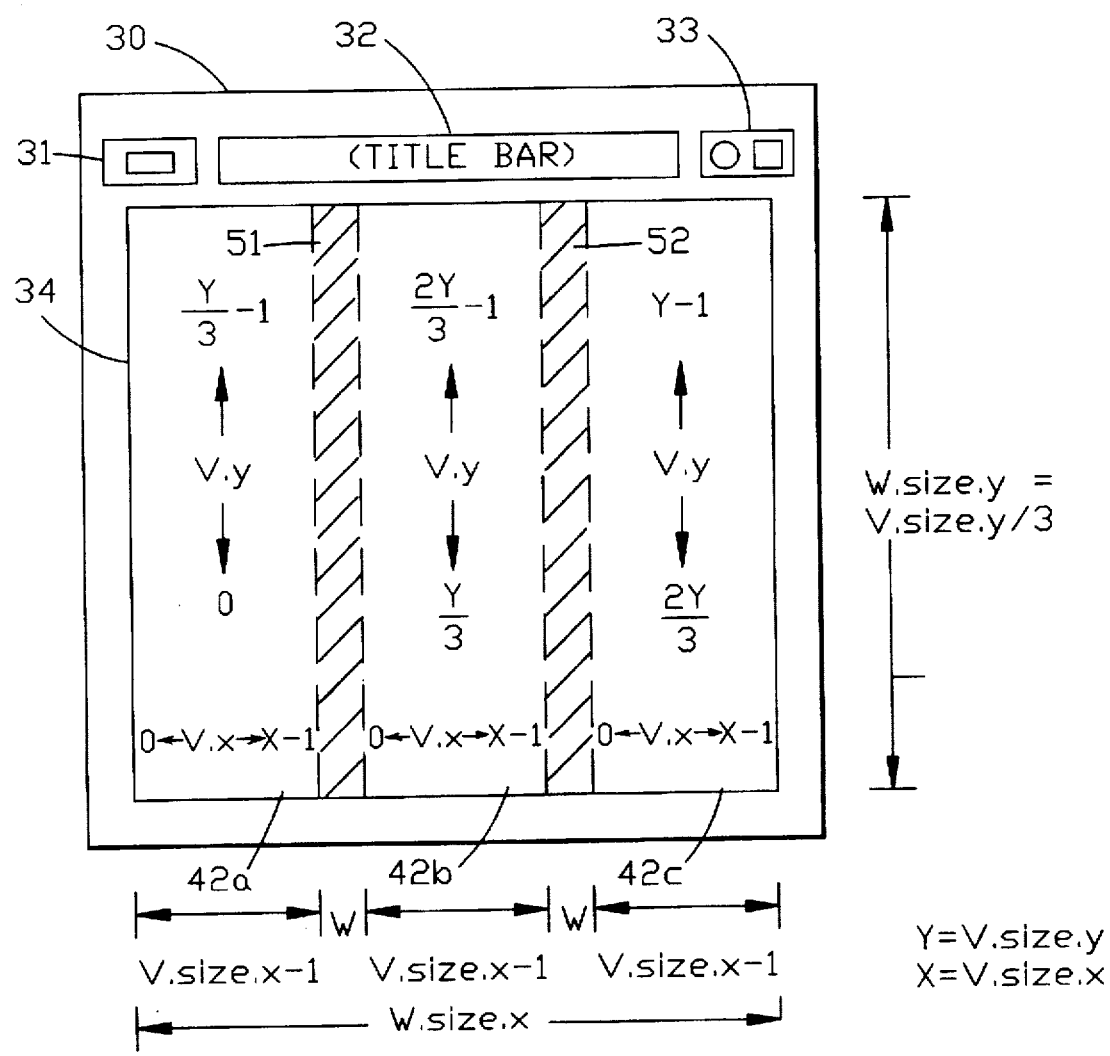
FIG. 5 illustrates a multi-column window with three columns, and the ranges of client window coordinates.

FIG. 5 illustrates the same set of windows making up an application window as in FIG. 3, for which, however, W.columns has been set to three. This corresponds to an arrangement of contours as in the case of FIG. 4A. There are now three sets of coordinates that can be used: (1) screen coordinates, (2) client window coordinates in which the client window has not been split into columns, and (3) client window coordinates as used by the application in which the client window consists of a single rectangular area (the contour of which is shown as 41 in FIG. 4A) consisting of the three columns 42a, 42b, and 42c logically glued together consecutively top and bottom. As in FIG. 4, the logical client window as seen by the application is referred to as V. Furthermore, the following notation will be used: the client window size for the third set of coordinates above is (V.size.x,V.size.y), and the client window coordinates for set 3 above are referred to as (V.x,V.y).

When the client window is split into three columns 42a, 42b, and 42c, the window manager draws two column boundaries 51 and 52 as shown in FIG. 5 of width w. This leaves a horizontal space of (W.size.x−2*w) to divide into three columns; thus V.size.x is (W.size.x−2*w)/3. V.size.y is the vertical space considering all three columns to be glued together. Thus V.size.y is 3*W.size.y. The column boundaries are drawn by the window manager as shaded or colored rectangular regions with corners, in W coordinates (the second set of coordinates above) at (V.size.x,0), (V.size.x+w,W.size.y) and (2*V.size.x+w,0), (2*V.size.x+2*w, W.size.y).

The range of logical client window coordinates (V.x,V.y) are shown in FIG. 5 for each of the three columns 42a, 42b, and 42c. Setting X to V.size.x and Y to V.size.y, in each column V.x ranges from 0 at the left column border to X−1 at the right column border. In the first (left-most) column 42a, V.y ranges from 0 at the bottom border to (Y/3)−1 at the top border. In the next (middle) column 42b, V.y ranges from Y/3 at the bottom border to (2*Y/3)−1 at the top border. In the last (right-most) column 42c, V.y ranges from (2*Y/3) at the bottom border to Y−1 at the top border.

For the general case of a multi-column window, FIG. 6 illustrates the means by which client window coordinates (V.x,V.y) are mapped to W coordinates and then to screen coordinates. This means would be used in the processing of all window manager functions to display data in a multi-column window. In an initialization step 60, which takes place when a multi-column window is created, or when the number of columns in the multi-column window is changed, or when the size of the window is changed, C is first set to the number of columns, W.columns. Next, the horizontal size V.size.x is computed as (W. size.x−(C−1)*w)/C, and X is set to this value. Finally, the vertical size V.size.y is computed as C*W. size.y, and Y is set to this value.

Figure 1:
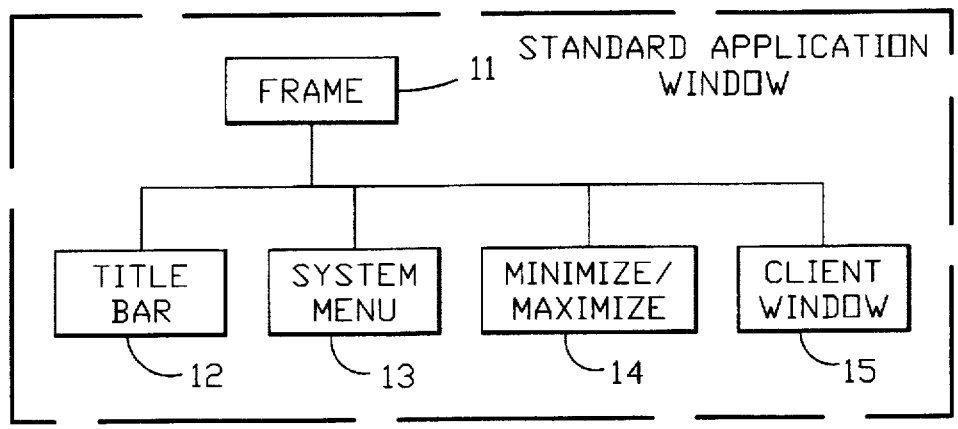
FIG. 1 illustrates a standard window hierarchy typical of current window managers.
Figure 2:
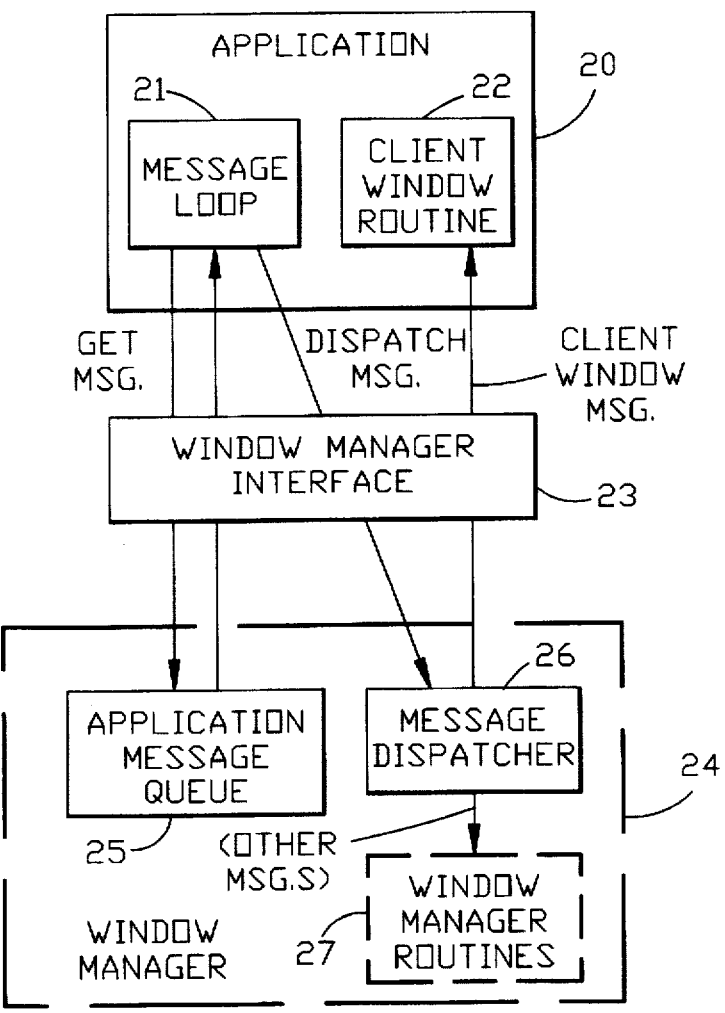
FIG. 2 shows the message-passing architecture used to implement window-based application programs in some current window managers.

Whenever a call to the window manager from the client window routine (see 22 of FIG. 2) results in data display, then for each point (V.x,V.y) in client window coordinates at which data is to be displayed, it is determined in step 61 if the coordinates lie inside the logical client window (i.e., the rectangular window formed by logically "gluing" the columns together). If not, no data is displayed; otherwise, control passes to step 62. In step 62, the column number of the column in which the data should be displayed is computed by dividing V.y by (Y/C), and, as indicated by the "truncate" function, discarding the fractional part. The result is an integer in the range 0 to C−1, where a 0 indicates the first (left-most) column, where a 1 indicates the next column, etc. N is then set to this value (62). Next, in step 63, W.x is computed by adding N*(X+w) to V.x. Next, in step 64, W.y is computed by subtracting N*(Y/C) from V.y. At this point, the coordinates (W.x,W.y) have been determined for displaying data in the client window in the case where the client window is not considered to be divided into columns. In step 65, the data is displayed by the window manager in the usual fashion at screen coordinates (W.origin.x+W.x,W.origin.y+W.y).

Whenever a message for the client routine (22) is generated by the window manager that includes client window coordinates (for example, a mouse button is pressed when the mouse position is within the client window W 34), then if W.columns is greater than one, the window manager will transform W coordinates to client window V coordinates as follows, where C, X, Y, and w are as above. First, the column number N is found by dividing W.x by (X+w) and discarding the fractional part, resulting in an integer ranging from 0 to C−1. Next, V.x is found by subtracting N*(X+w) from W.x. The resulting value for V.x ranges from 0 to X+w. If V.x is greater than or equal to X then the coordinates actually lie in the column boundary, and the message is discarded. Otherwise, V.y is found by adding N*(Y/C) to W.y, and the message generated for the client window routine uses coordinates (V.x,V.y).

Having thus described our invention, what we claim as new and desire to secure by Letters Patents is:

1. In a computer system having a processor and an electronic display device, a method of displaying data on said device, said method comprising:

a. converting first location information for said data from an application program into second location information for said data, where said first location information is for a logical display area on a first contour and where said second location information is for a plurality of contours, each of said second contours being a logical section of said first contour, where said conversion is transparent to said application program; and b. displaying said data on said display device at locations in said second contours in accordance with said second location information.

2. A method of displaying data as recited in claim 1, wherein said first location information comprises cartesian coordinates of points within said first contour and corresponding to where in said contour said data should be displayed.

3. A method as recited in claim 1, wherein said second location information comprises cartesian coordinates corresponding to where said data should be displayed in said second contours.

4. A method as recited in claim 1, wherein said first and said second contours are rectangles.

5. A method as recited in claim 1, wherein the vertical length of said first contour exceeds the vertical length of said display area or the horizontal length of said first contour exceeds the horizontal length of said display area.

6. A method as recited in claim 1, wherein said second plurality of contours is a set of adjoining congruent rectangles.

7. A computer system for displaying data, said system comprising:

a. an electronic display device;

b. means for converting first location information for said data from an application program into second location information for said data, where said first location information is for a logical display area on a first contour and where said second location information is for a a plurality of contours, each of said second contours being a logical section of said first contour, where said conversion is transparent to said application program; and c. means for displaying said data on said display device at locations in said second contours in accordance with said second location information.

* * * * *